United States Patent
Tan (10) Patent No.: US 11,233,812 B2
(45) Date of Patent: Jan. 25, 2022

(54) ACCOUNT THEFT RISK IDENTIFICATION (71) Applicant: Advanced New Technologies Co., Ltd., George Town (KY)

(72) Inventor: Chunping Tan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 397 days.

(21) Appl. No.: 15/816,207

(22) Filed: Nov. 17, 2017

(65) Prior Publication Data
US 2018/0077192 A1    Mar. 15, 2018

Related U.S. Application Data

(63) Continuation of application No. PCT/CN2016/080446, filed on Apr. 28, 2016.

(30) Foreign Application Priority Data

May 29, 2015 (CN) .......................... 201510289825.4

(51) Int. Cl.
*H04L 29/06* (2006.01)
*G06F 21/57* (2013.01)
(Continued)

(52) U.S. Cl.
CPC .......... *H04L 63/1433* (2013.01); *G06F 21/57* (2013.01); *H04L 63/08* (2013.01);
(Continued)

(58) Field of Classification Search
CPC ............... H04L 63/1433; H04L 63/107; H04L 63/0876; H04L 63/08; H04W 12/1206;
(Continued)

(56) References Cited

U.S. PATENT DOCUMENTS 8,295,898 B2 * 10/2012 Ashfield ............ G06Q 20/3224
455/456.1
8,904,496 B1    12/2014 Bailey
(Continued)

FOREIGN PATENT DOCUMENTS

CN        1497450        5/2004
CN        1801764        7/2006
(Continued)

OTHER PUBLICATIONS

"China: Resident Identity Cards; background information; description; issuance procedures", authored by Research Directorate, Immigration and Refugee Board, Canada, Feb. 24, 2005, pp. 1-9, obtained from https://www.refworld.org/docid/42df60b529.html (Year: 2005).*

(Continued)

*Primary Examiner* — Jeffrey D. Popham
(74) *Attorney, Agent, or Firm* — Fish & Richardson P.C.

(57) ABSTRACT

An operation request is received from a terminal device. An identification of the terminal device is determined. Based on the identification of the terminal device, historical operation requests initiated from the terminal device in a predetermined time period prior to the operation request are determined. A user identity location is determined for each historical operation request. A number of different user identity locations for the historical operation requests is determined. Based on the number of different user identity locations, an account theft risk value is determined.

20 Claims, 5 Drawing Sheets

(51) Int. Cl.
　　*H04W 12/06*　　(2021.01)
　　*H04W 12/126*　(2021.01)
　　*H04W 12/63*　　(2021.01)

(52) U.S. Cl.
　　CPC ........ *H04L 63/0876* (2013.01); *H04L 63/107* (2013.01); *H04W 12/06* (2013.01); *H04W 12/126* (2021.01); *H04W 12/63* (2021.01)

(58) Field of Classification Search
　　CPC . H04W 12/06; H04W 12/00503; G06F 21/57; G06F 21/577; G06F 21/31
　　See application file for complete search history.

(56) References Cited

U.S. PATENT DOCUMENTS

| | | | |
|---|---|---|---|
| 10,142,308 B1* | 11/2018 | Duchin | G06F 21/316 |
| 2010/0130172 A1 | 5/2010 | Vendrow et al. | |
| 2013/0254857 A1 | 9/2013 | Bajenov et al. | |
| 2013/0326607 A1 | 12/2013 | Feng | |
| 2015/0310434 A1* | 10/2015 | Cheung | G06Q 20/12 705/44 |
| 2015/0326595 A1 | 11/2015 | Liu et al. | |
| 2016/0171499 A1* | 6/2016 | Meredith | G06Q 20/3224 705/44 |

FOREIGN PATENT DOCUMENTS

| | | |
|---|---|---|
| CN | 102200987 | 9/2011 |
| CN | 102325062 | 1/2012 |
| CN | 103001826 | 3/2013 |
| CN | 103023718 | 4/2013 |
| CN | 103024744 | 4/2013 |
| CN | 103297444 | 9/2013 |
| CN | 103532797 | 1/2014 |
| CN | 103581355 | 2/2014 |
| CN | 104144419 | 11/2014 |
| CN | 104601547 | 5/2015 |
| CN | 104618919 | 5/2015 |
| JP | 2008503001 | 1/2008 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Search Report and Examination Report of the Intellectual Property Office of Singapore issued in Singapore Application No. 11201709594X dated Aug. 7, 2018; 7 pages.

European Extended Search Report in European Application No. 16802418.0, dated Nov. 14, 2018, 9 pages.

International Search Report issued by the International Searching Authority in International Application No. PCT/CN2016/080446 dated Jul. 26, 2016; 8 pages.

PCT International Preliminary Report on Patentability in International Application No. PCT/CN2016/080446, dated Dec. 5, 2017, 9 pages (with English translation).

* cited by examiner

ACCOUNT THEFT RISK IDENTIFICATION

This application is a continuation of PCT Application No. PCT/CN2016/080446, filed on Apr. 28, 2016, which claims priority to Chinese Patent Application No. 201510289825.4, filed on May 29, 2015, and each application is incorporated by reference in its entirety.

BACKGROUND

Account theft is acquisition of private information (such as, personally identifying information or financial information) through unauthorized access to an online account and use of the private information to defraud or impersonate a different person. For example, an unauthorized user can acquire and use another user's user ID and password to login to the other user's online account for performing unauthorized activities, such as unauthorized payments or transactions, impersonating the other user, or other illicit activities. Account theft can occur while performing online transactions, mobile payments, and using other online applications, such as email and social media.

SUMMARY

The present disclosure describes identifying a risk level for account theft.

In an implementation, an operation request is received from a terminal device. An identification of the terminal device is determined. Based on the identification of the terminal device, historical operation requests initiated from the terminal device in a predetermined time period prior to the operation request are determined. A user identity location is determined for each historical operation request. A number of different user identity locations for the historical operation requests is determined. Based on the number of different user identity locations, an account theft risk value is determined.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. The described approach can effectively and accurately identify whether a current operation request (such as, a login or other request) is associated with account theft. The described account theft identification is based on a number of different user identity locations for historical operation requests initiated from the same terminal device as the current operation request. The described approach improves account theft identification by considering multiple operation requests from multiple user accounts. Specifically, this disclosure provides an improved approach for account theft identification than existing approaches where identifying account theft is only based on transaction or login requests, or based on a number of different user accounts logged in from a terminal device.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes identifying a risk level for account theft, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Account theft is acquisition of private information (such as, personally identifying information or financial information) through unauthorized access to an online account and use of the private information to defraud or impersonate a different person. For example, an unauthorized user can acquire and use another user's user identification (ID) and password to login to the other user's online account for performing unauthorized activities, such as unauthorized payments or transactions, impersonating the other user, or other illicit activities. Account theft can occur while performing online transactions, mobile payments, and using other online applications, such as email and social media. Account theft can also be referred to as identity theft.

Some existing approaches identify account theft based on transaction or login requests. For example, if a user logs into their account associated with an online application from a remote location (such as, a country different from the user's resident country), an application server can send a message (such as a text message or an email) for requesting the user to verify the login request. In some cases, the application server determines the remote location based on an IP address of the login device. However, a device's Internet Protocol (IP) address may change from time to time due to dynamic address allocation. As a result, the application server may not correctly identify whether the user logs in from a remote location, and generate false alarms indicating account theft. Some other existing approaches identify account theft based on a number of different user accounts logged in from a device. For example, after an application server receives a login request from a particular device, the application server can determine the number of different user accounts that were logged in from that particular device. If a number of different user accounts exceeding a particular defined threshold were logged in from the particular device, the application server may determine that the current login request is an unauthorized login request. For example, an account thief may use their computer to log into multiple users' accounts. However, this approach is ineffective for public devices, such as a public computer that used by different users to log into their own accounts.

At a high level, the described approach identifies account theft based on user identity locations associated with prior operation requests on a device (or terminal device). For example, when a server (or network server) receives a current operation request associated with a user account (for example, a login request) from a device, the server identifies the device and collects information of prior operation requests that have been performed on the same device during a predefined time period prior to the current operation request. The server analyzes each prior operation request, and identifies a user identity location for each prior operation request. The user identity location refers to a location associated with a user identity. For example, when a user registers for an online account, the server can request the user to enter information of a user identity, such as an identification number on a Chinese resident ID card where the first six digits of the identification number indicate the user's resident city (or county). The user's resident city indicated by the Chinese resident ID card is considered to be the user identity location. For each prior operation request, the server identifies the associated user account as well as the user identity location associated with the user account. The server counts a number of different user identity locations associated with the prior operation requests, and determines whether the current operation request is associated with account theft. For example, if the number of different user identity locations for prior operation requests performed on the same device as the current operation request is more than a threshold, the server can identify the current operation request as a potential account theft, and send a message (for example, a text message or an email) to the user associated with the current operation request for verification. In other words, if the prior operation requests on the device are associated with users from a large number of different user identity locations, the device may belong to a thief and is used for unauthorized access to other users' accounts.

Compared to the previously discussed existing approach that identifies a potential account theft by counting a number of different user accounts for the operation requests on the device, the described approach reduces false alarms and effectively identifies a potential account theft. For example, for a public device, although a large number of different user accounts are logged in from the public device, the number of different user identity locations associated with these user accounts can be a small number, because most user accounts are associated with local residents that have a same user identity location. The described approach does not raise an alarm for account theft unless the number of different user identity locations exceeds a threshold.

Figure 1:
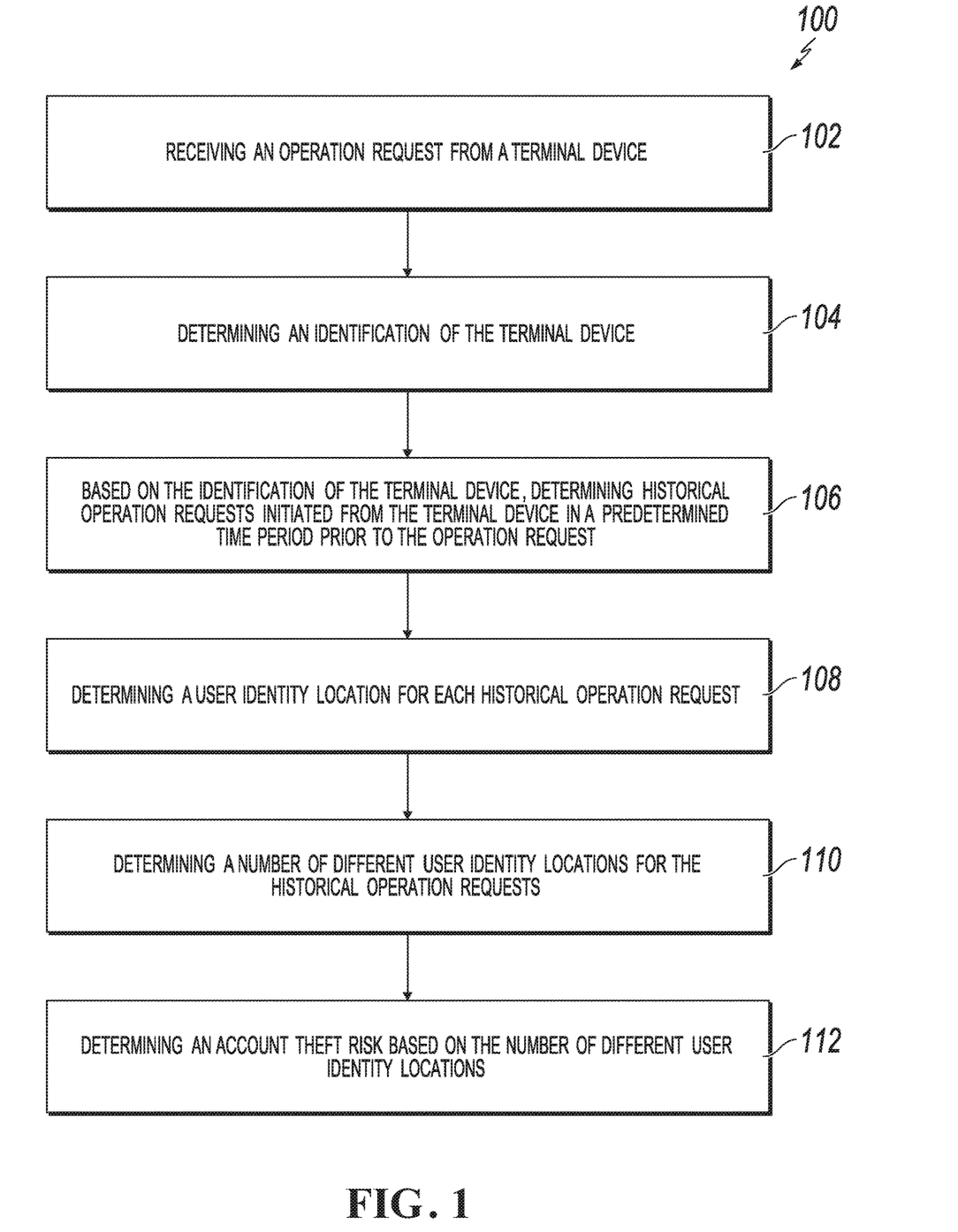
FIG. 1 is a flowchart illustrating an example of a computer-implemented method for identifying a risk level for account theft, according to an implementation of the present disclosure.

FIG. 1 is a flowchart illustrating an example of a computer-implemented method 100 for identifying a risk level for account theft, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, a server receives an operation request from a terminal device. A user can initiate an operation request from a terminal device. For example, a user can use their mobile phone to log into their online bank account. The server is located in a computer network connected to the terminal device. The operation request can be any request for performing data operation or data exchange with the computer network, such as a login request for a user account, a password modification request for a user account, a balance transfer request for a user account, or a transaction request for a user account. The terminal device can be any client terminal such as a mobile terminal, a mobile phone, a mobile communication device, a personal computer, a laptop, a tablet, or an automated teller machine (ATM). In some cases, the server can determine different operation requests a user can perform, and the terminal device can display options for a user from which to select. From 102, method 100 proceeds to 104.

At 104, the server determines identification information of the terminal device from which the operation request is received. In some implementations, the identification information of a terminal device can include a device type, a device identification code, or both. For example, the device identification code can be a Medium Access Control (MAC) physical address, a Unique Material Identifier (UMID), an Internet Protocol (IP) address, an International Mobile Equipment Identity (IMEI), a Thread Identifier (TID), a mobile phone number, or others. In some cases, different types of terminal devices can have different device identification codes. For example, the device identification code of a personal computer (PC) can include at least one of a MAC address, an IP address, or a UMID. The device identification code of a mobile terminal can include at least one of a MAC address, an IMEI, a TID, or a mobile phone number. In some cases, the type of the device is first determined, and the corresponding device identification code is collected. For example, if the device is a PC, at least one of a MAC address, an IP address, or a UMID is collected. If the device is a mobile terminal, at least one of a MAC address, an IMEI, a TID, or a mobile phone number is collected. In some cases, the terminal device determines the device type and the device identification code and sends the determined information to the server.

In some cases, the operation request includes user identification information and terminal device information. For example, after the user types in the user ID and password on a login webpage, a login request can be generated and sent to the server. The login request can include the user-entered user ID and password identifying the user, identification information of the terminal device at which the user initiates the login request (for example, the type of the terminal device, the device identification code, or both), information of the server receiving the login request, and time information of the login request. The login request is sent to the server based on the information in the login request. The server can determine identification information of the terminal device based on the received login request.

In some implementations, routing path information of the operation request is determined based on the server information and the terminal device information in the operation request. The server also identifies the user based on the user identification information in the operation request. The server further identifies routing path information for prior operation requests from the same user. Account theft may be identified by comparing the routing path information of the current operation request to the routing path information of prior operation requests. For example, if a current operation request from a user is from a terminal device different than terminal devices of prior operation requests from the same user, that user's account may have been compromised and the current operation request may be initiated by a thief from a remote location. From 104, method 100 proceeds to 106.

At 106, the server determines historical operation requests initiated from the same terminal device as the current operation request and occurred in a predetermined time period prior to the current operation request. The predetermined time period can be determined by the server based on factors such as characteristics of the current operation request and a type of the terminal device of the current operation request. For example, the predetermined time period for a mobile terminal may be longer than the predetermined time period for a public computer, because a public computer has more frequent operation requests than a personal mobile terminal. For example, the predetermined time period can be 30 minutes, 2 hours, 12 hours, 1 day, 3 days, 7 days, or other time period prior to the current operation request.

After identifying the particular terminal device of the current operation request, the server can identify historical operation requests from all user accounts occurred on the particular terminal device in the predetermined time period prior to the current operation request. In some cases, information of historical operation requests can be stored in a database. As discussed previously, each operation request can include a time of the operation request, terminal device information such as the device identification code, and a user ID and a password identifying a user account. Based on the information in each operation request, the server can identify historical operation requests occurred on a particular terminal device in a predetermined time period prior to the current operation request. For example, by matching the device identification codes, operation requests occurred on a same terminal device can be identified. From 106, method 100 proceeds to 108.

At 108, a user identity location is determined for each identified historical operation request. The user identity location can be determined based on a credential type and a credential number the user provided during the initial user account registration. As discussed previously, when a user registers for an online account, a real name authentication can be performed. For instance, in addition to selecting a user ID and a password, the user also selects a credential type (such as a Chinese resident ID card) and enters a corresponding credential number (such as a Chinese resident ID number). For example, the first six digits of a Chinese resident ID number represent an administrative region such as a county or a city. Based on the first six digits, an administrative region where the user is from is determined, and the determined administrative region or the first six digits is considered to be the user identity location. Each credential number is assumed to include user location information. Different credential types may include user location information in different portions of the credential number. Based on the credential type, corresponding location information can be determined from the credential number. From 108, method 100 proceeds to 110.

At 110, the server determines a number of different user identity locations for the historical operation requests occurred on the same terminal device as the current operation request in the predetermined time period prior to the current operation request. For example, after the server determines a user identity location for each historical operation request, the number of different user identity locations on the particular terminal device of the current operation request in the predetermined time period is counted. In some cases, at 104, the device identification code may include multiple device identifiers, for example, both a MAC address and an IMEI for a mobile phone. For each device identifier, the number of different user identity locations is counted. If the terminal device of the current operation request cannot be determined (for example, the operation request does not include the terminal device information), the number of different user identity locations is set as 0.

The account theft prediction accuracy is correlated to a granularity of the user identity location. A large granularity (such as province) may cause miss detections (miss true account thefts), while a small granularity (such as street) may cause false alarms (report account thefts while there is none). As will be shown in FIG. 2, city or county is the appropriate granularity of the user identity location to enable effective and accurate predictions for account theft. Also, as will be shown in FIG. 2, the number of different user identity locations for historical operation requests occurred on the terminal device of the current operation request in the predetermined time period prior to the current operation request is an effective input variable for risk prediction of account theft. From 110, method 100 proceeds to 112.

At 112, an account theft risk level is determined based on the number of different user identity locations determined at step 110. For example, the number of different user identity locations is used as an input variable of a scoring model for evaluating an account theft risk level. If the account theft risk level exceeds a threshold, account theft is identified. In some cases, the number of different user identity locations is considered as an account theft risk level. If the number of different user identity locations exceeds a threshold, account theft is identified, and a message (such as a text message or an email) is sent to the user for verification. In some cases, a prompt can be displayed on the terminal device so that the user can enter additional information for verification.

In some cases, the account theft risk level determined at 112 is considered to be an account theft risk level for the terminal device. For improving the account theft prediction accuracy, an overall risk level can be determined based on the account theft risk level for the terminal device and an account theft risk level for the user of the current operation request. If the overall risk level is higher than a threshold, account theft is determined. The account theft risk level for the user of the current operation can be based on factors such as a number of mobile phone numbers bound to the user, a number of devices for historical operation requests from the user, a number of IP addresses for historical operation requests from the user, difference between information of the current operation request and information of historical operation requests from the user, whether routing characteristic information of the current operation request is the same as routing characteristic information of historical operation requests. In some cases, the account theft risk level for the terminal device can also be based on a total number of different users initiated operation requests on the terminal device of the current operation request. After 112, method 100 stops.

Effectiveness of using the variable "the number of different user identity locations on the terminal device of the current operation request in the predetermined time period prior to the current operation request" for predicting account theft can be verified by applying the described approach in this disclosure to historical operation requests. Note that whether a historical operation request is related to account theft is prior knowledge. For verifying the effectiveness of the described approach, a historical operation request can be selected. The described approach is used to predict whether the selected historical operation request is account theft, and compare the prediction result to the known result. The described approach is used to predict account theft for a large number of historical operation requests, and determine a prediction accuracy. The described approach is considered to be effective if the prediction accuracy exceeds a threshold.

The effectiveness of using the variable "the number of different user identity locations on the terminal device of the current operation request in the predetermined time period prior to the current operation request" for predicting account theft can also be verified by quantitative indexes such as a lift, a weight-of-evidence (WOE), and an interval information value (IV) as shown in the following:

Lift=interval stolen account transaction concentration/average stolen account transaction concentration, WOE=ln(ratio of interval non-stolen account transactions to all non-stolen account transactions/ratio of interval stolen account transactions to all stolen account transactions)×100, Interval IV=WOE×(ratio of interval non-stolen account transactions to all non-stolen account transactions−ratio of interval stolen account transactions to all stolen account transactions), and IV=sum of interval IVs.

For ease of analysis, the WOE is multiplied by a coefficient 100 so that the WOE is essentially the same as an index WOE in data mining. Note that "transaction" in the foregoing formula can be interpreted as a generalized network operation request. Table 1 shows calculated quantitative indexes illustrating effectiveness of the variable "the number of different user identity locations on a MAC terminal device of the current operation request in 7 days prior to the current operation request" for predicting account theft. The results in Table 1 are also shown in FIG. 2.

Figure 2:
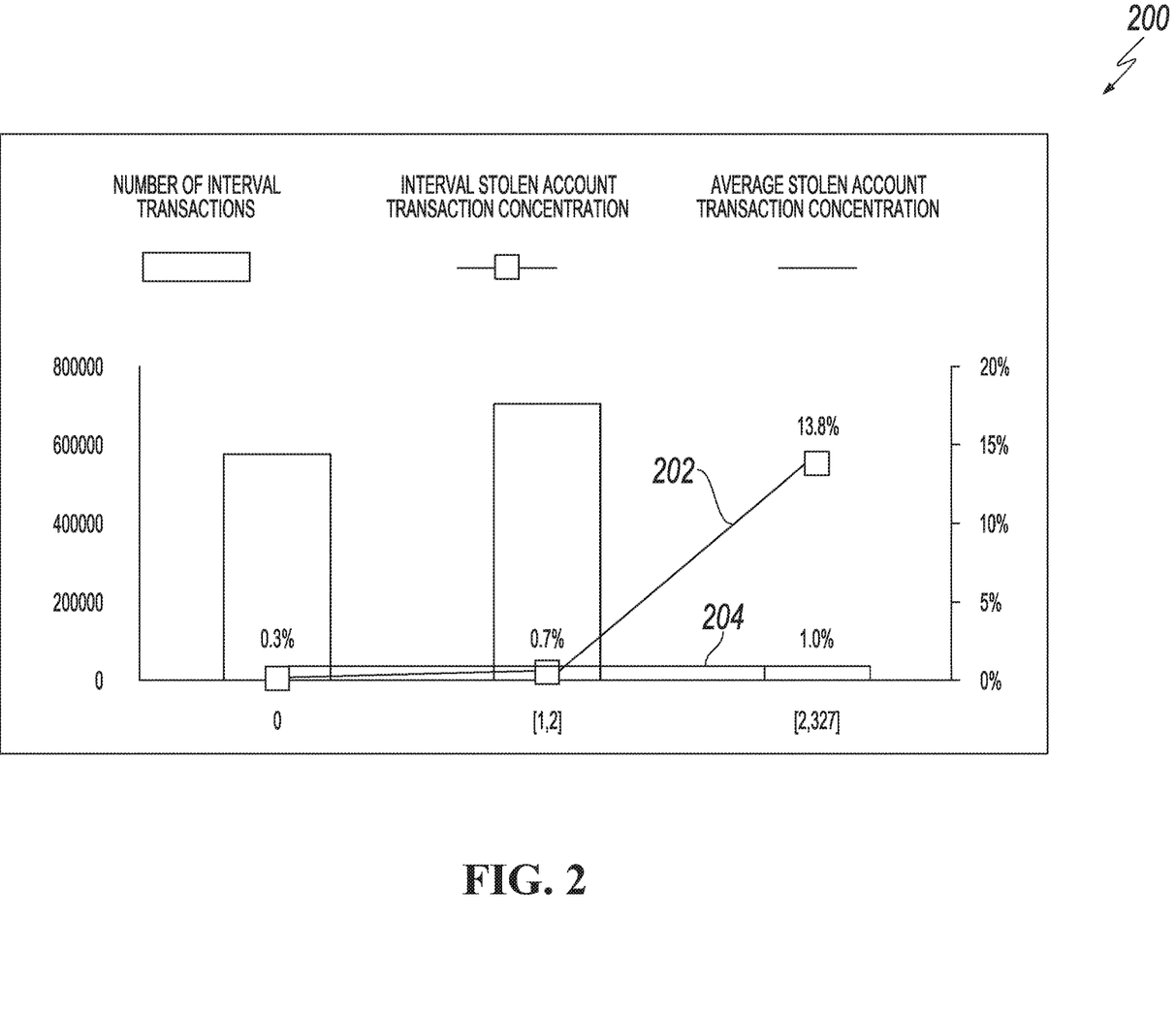
FIG. 2 is a diagram illustrating an account theft identification capability of a number of different user identity locations on a Medium Access Control (MAC) device in 7 days prior to an operation request, according to an implementation of the present disclosure.

FIG. 2 is a diagram 200 illustrating account theft identification capability of a number of different user identity locations on a MAC device in 7 days prior to an operation request, according to an implementation of the present disclosure. FIG. 2 shows a relation between an account theft risk and the number of different user identity locations on a MAC device of a payment platform in 7 days prior to a current operation request. FIG. 2 includes a curve 202 indicating interval stolen account transaction concentrations for different intervals, and a curve 204 indicating average stolen account transaction concentrations for different intervals.

Table 1 and FIG. 2 illustrates a lift of 13.82 when the number of different user identity locations on the device is greater than 2. In other words, the capability of identifying account theft based on the number of different user identity analysis locations of operation requests on the MAC device in 7 days is lifted by 13.82 times, which indicates that the effectiveness of the described approach. Table 1 and FIG. 2 also show large IV values, which indicates that an "over-prediction" phenomenon (predict account theft while there is none) may occur. For reducing the over-prediction, as discussed previously, an overall account theft risk level can be determined based on both an account theft risk level for the terminal device and an account theft risk level for the user.

Figure 3:
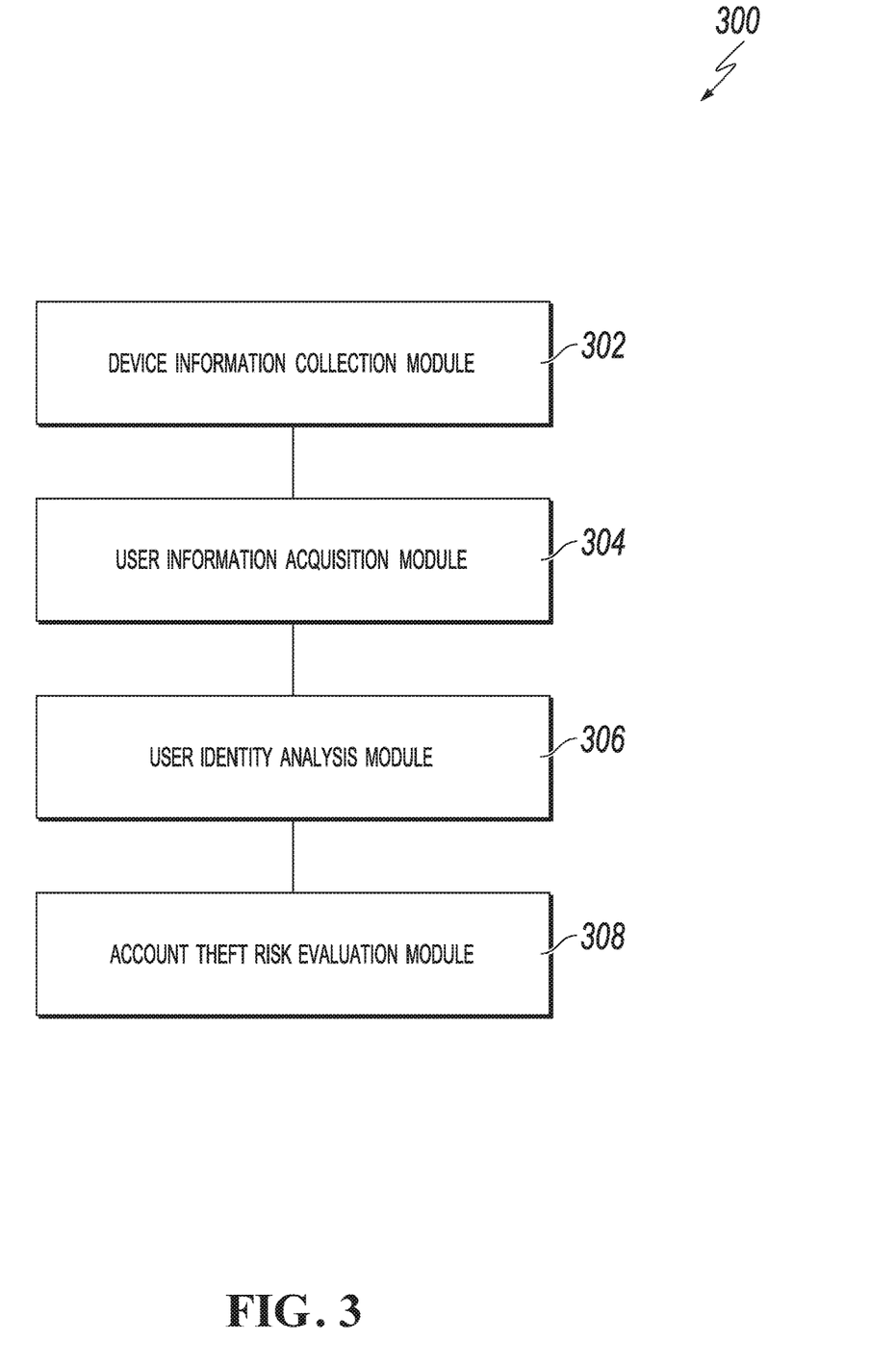
FIG. 3 is a block diagram illustrating an example of an account theft risk identification system, according to an implementation of the present disclosure.

FIG. 3 is a block diagram illustrating an example of an account theft risk identification system 300, according to an implementation of the present disclosure. The system 300 includes a device information collection module 302, a user information acquisition module 304, a user identity analysis module 306, and an account theft risk evaluation module 308.

As discussed previously, the device information collection module 302 collects device information of a terminal device from which a current operation request is received. For example, a MAC address, an IP address, or a UMID can be collected for a PC, and a MAC address, an IMEI, a TID, or a mobile phone number can be collected for a mobile communication device. The user information acquisition module 304 determines historical operation requests initiated from the same terminal device as the current operation request within a predetermined time period prior to the current operation request. The user information acquisition module 304 also determines user identity information for each historical operation request. For example, the user identity information can include a credential type and a credential number. The user identity analysis module 306 determines a user identity location for each historical operation request. For example, if the credential number is a Chinese resident ID number, the user identity location is determined by the first six digits of the Chinese resident ID number. The account theft risk evaluation module 308 counts a number of different user identity locations for the

TABLE 1

Account theft identification capability of the number of different user identity locations on a MAC device in 7 days prior to an operation request

| Interval | The number of interval | The number of account theft | Interval account theft operation | Average account theft operation | Lift | Interval IV value | IV value |
| --- | --- | --- | --- | --- | --- | --- | --- |
| 0 | 578,007 | 1,934 | 0.3% | 1.0% | 0.33 | 32.07 | 171.74 |
| [1, 2] | 704,478 | 4,602 | 0.7% | 1.0% | 0.65 | 7.9 | 171.74 |
| (2,327] | 48,887 | 6,756 | 13.8% | 1.0% | 13.8 | 131.77 | 171.74 | historical operation requests, and evaluates an account theft risk level for the device based on the number of different user identity locations.

Figure 4:
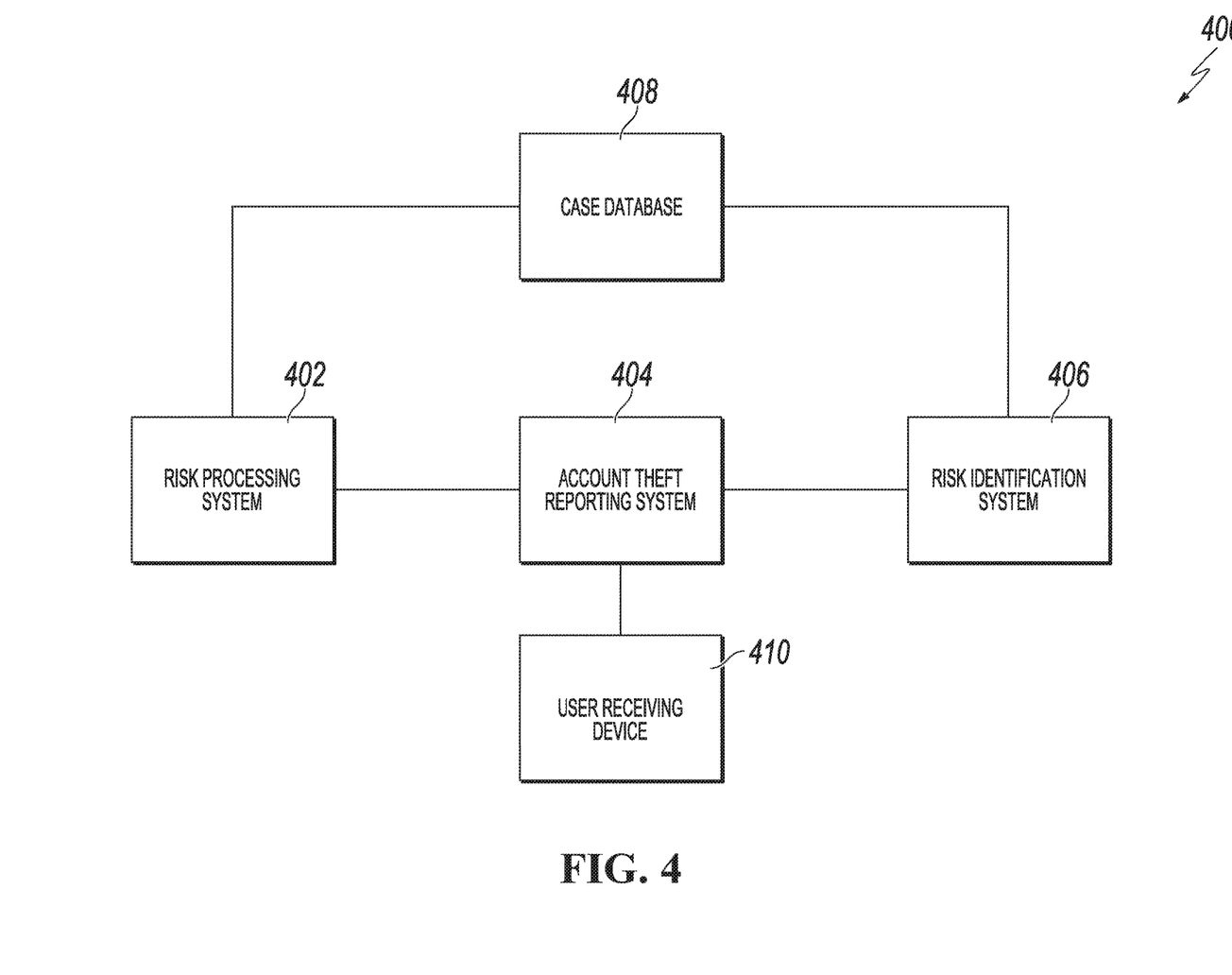
FIG. 4 is a block diagram illustrating an example of an account theft risk prevention and control system, according to an implementation of the present disclosure.

FIG. 4 is a block diagram illustrating an example of an account theft risk prevention and control system 400, according to an implementation of the present disclosure. The risk prevention and control system 400 can be used to reduce account theft risk for a user. The system 400 has a risk processing system 402, an account theft reporting system 404, a risk identification system 406, a case database 408, and a user receiving device 410. The risk identification system 406 can be implemented by the system 300 in FIG. 3.

The risk identification system 406 calculates an account theft risk value, and identifies account theft when the risk value exceeds a threshold. For example, the risk value can be based on a number of different user identity locations of historical operation requests. When account theft is identified for a victim user, the risk identification system 406 notifies the account theft reporting system 404. The account theft reporting system 404 can send an account theft message to the risk processing system 402 and a user receiving device 410 (for example, a mobile phone of the victim user). The risk processing system 402 can block or deny operation requests associated with the stolen account and collect risk data associated with the stolen account based on the received account theft message. The case database 408 can store the risk data collected by the risk processing system 402 so that the account theft prediction accuracy of the risk identification system 406 can be verified.

Figure 5:
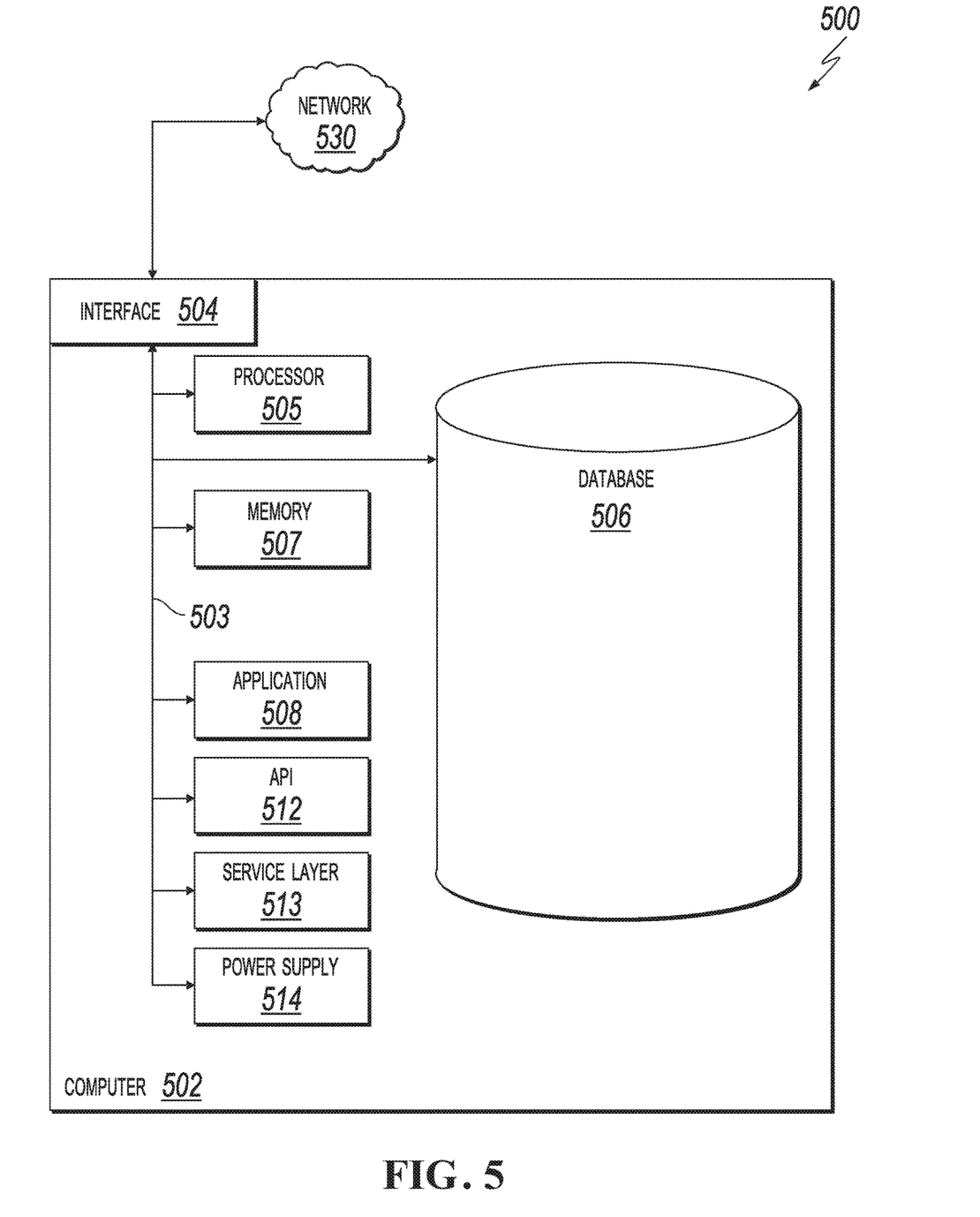
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some implementations, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some implementations, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: receiving an operation request from a terminal device; determining an identification of the terminal device; based on the identification of the terminal device, determining historical operation requests initiated from the terminal device in a predetermined time period prior to the operation request; determining a user identity location for each historical operation request; determining a number of different user identity locations for the historical operation requests; and determining an account theft risk value based on the number of different user identity locations.

The foregoing and other described implementations can each, optionally, include one or more of the following features:

A first feature, combinable with any of the following features, wherein the terminal device is a PC, and the identification of the terminal device includes at least one of a MAC address, an IP address, or a UMID.

A second feature, combinable with any of the previous or following features, wherein the terminal device is a mobile communication device, and the identification of the terminal device includes at least one of a MAC address, an IMEI, a TID, or a mobile phone number.

A third feature, combinable with any of the previous or following features, wherein each historical operation request is associated with an online account of a particular user, and determining a user identity location for each historical operation request includes determining the user identity location based on a credential type and a credential number of the particular user.

A fourth feature, combinable with any of the previous or following features, wherein the credential type is a resident ID card, and the credential number is a resident ID number.

A fifth feature, combinable with any of the previous or following features, wherein the user identity location is determined by initial digits of the resident ID number.

A sixth feature, combinable with any of the previous or following features, further comprising determining account theft if the account theft risk value exceeds a threshold.

In a second implementation, a non-transitory, computer-readable medium storing one or more instructions executable by a computer system to perform operations comprising: receiving an operation request from a terminal device; determining an identification of the terminal device; based on the identification of the terminal device, determining historical operation requests initiated from the terminal device in a predetermined time period prior to the operation request; determining a user identity location for each historical operation request; determining a number of different user identity locations for the historical operation requests; and determining an account theft risk value based on the number of different user identity locations.

The foregoing and other described implementations can each, optionally, include one or more of the following features:

A first feature, combinable with any of the following features, wherein the terminal device is a PC, and the identification of the terminal device includes at least one of a MAC address, an IP address, or a UMID.

A second feature, combinable with any of the previous or following features, wherein the terminal device is a mobile communication device, and the identification of the terminal device includes at least one of a MAC address, an IMEI, a TID, or a mobile phone number.

A third feature, combinable with any of the previous or following features, wherein each historical operation request is associated with an online account of a particular user, and determining a user identity location for each historical operation request includes determining the user identity location based on a credential type and a credential number of the particular user.

A fourth feature, combinable with any of the previous or following features, wherein the credential type is a resident ID card, and the credential number is a resident ID number.

A fifth feature, combinable with any of the previous or following features, wherein the user identity location is determined by initial digits of the resident ID number.

A sixth feature, combinable with any of the previous or following features, wherein the operations further comprise determining account theft if the account theft risk value exceeds a threshold.

In a third implementation, A computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving an operation request from a terminal device; determining an identification of the terminal device; based on the identification of the terminal device, determining historical operation requests initiated from the terminal device in a predetermined time period prior to the operation request; determining a user identity location for each historical operation request; determining a number of different user identity locations for the historical operation requests; and determining an account theft risk value based on the number of different user identity locations.

The foregoing and other described implementations can each, optionally, include one or more of the following features:

A first feature, combinable with any of the following features, wherein the terminal device is a PC, and the identification of the terminal device includes at least one of a MAC address, an IP address, or a UMID.

A second feature, combinable with any of the previous or following features, wherein the terminal device is a mobile communication device, and the identification of the terminal device includes at least one of a MAC address, an IMEI, a TID, or a mobile phone number.

A third feature, combinable with any of the previous or following features, wherein each historical operation request is associated with an online account of a particular user, and determining a user identity location for each historical operation request includes determining the user identity location based on a credential type and a credential number of the particular user.

A fourth feature, combinable with any of the previous or following features, wherein the credential type is a resident ID card, and the credential number is a resident ID number.

A fifth feature, combinable with any of the previous or following features, wherein the user identity location is determined by initial digits of the resident ID number.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving an operation request from a terminal device;
determining an identification of the terminal device;
based on the identification of the terminal device, determining historical operation requests associated with a plurality of respective user accounts belonging respectively to a plurality of different users who initiated the historical operation requests from the terminal device in a predetermined time period prior to the operation request;
determining a respective user identity location for each historical operation request initiated by the plurality of different users based on respective user registration information for each of the plurality of different users, wherein a granularity of the user identity location is a city or a county;
computing, from the user registration information for the plurality of different users, a number of different cities or counties among the user identity locations for the plurality of different users associated with the historical operation requests;
computing a risk level for the terminal device based on the number of different cities or counties computed from the user registration information for the plurality of different users indicating the user identity locations for the plurality of different users associated with the historical operation requests initiated from the terminal device;
computing an account theft risk level for a user of the operation request; and
computing an overall account theft risk level by combining the risk level for the terminal device and the account theft risk level for the user of the operation request.

2. The computer-implemented method of claim 1, wherein the terminal device is a personal computer (PC), and the identification of the terminal device includes at least one of a Medium Access Control (MAC) address, an Internet Protocol (IP) address, or a Unique Material Identifier (UMID).

3. The computer-implemented method of claim 1, wherein the terminal device is a mobile communication device, and the identification of the terminal device includes at least one of a Medium Access Control (MAC) address, an International Mobile Equipment Identity (IMEI), a Thread Identifier (TID), or a mobile phone number.

4. The computer-implemented method of claim 1, wherein, determining the respective user identity location for each historical operation request initiated by the plurality of different users based on the respective user registration information for each of the plurality of different users comprises determining the respective user identity location based on a credential type and a credential number comprised in the respective user registration information.

5. The computer-implemented method of claim 4, wherein the credential type is a resident identification (ID) card, and the credential number is a resident ID number.

6. The computer-implemented method of claim 5, wherein the user identity location is determined by initial digits of the resident ID number.

7. The computer-implemented method of claim 1, further comprising determining account theft if the overall account theft risk level exceeds a threshold.

8. A non-transitory, computer-readable medium storing one or more instructions executable by a computer system to perform operations comprising:
   receiving an operation request from a terminal device;
   determining an identification of the terminal device;
   based on the identification of the terminal device, determining historical operation requests associated with a plurality of respective user accounts belonging respectively to a plurality of different users who initiated the historical operation requests from the terminal device in a predetermined time period prior to the operation request;
   determining a respective user identity location for each historical operation request initiated by the plurality of different users based on respective user registration information for each of the plurality of different users, wherein a granularity of the user identity location is a city or a county;
   computing, from the user registration information for the plurality of different users, a number of different cities or counties among the user identity locations for the plurality of different users associated with the historical operation requests;
   computing a risk level for the terminal device based on the number of different cities or counties computed from the user registration information for the plurality of different users indicating the user identity locations for the plurality of different users associated with the historical operation requests initiated from the terminal device;
   computing an account theft risk level for a user of the operation request; and
   computing an overall account theft risk level by combining the risk level for the terminal device and the account theft risk level for the user of the operation request.

9. The non-transitory, computer-readable medium of claim 8, wherein the terminal device is a personal computer (PC), and the identification of the terminal device includes at least one of a Medium Access Control (MAC) address, an Internet Protocol (IP) address, or a Unique Material Identifier (UMID).

10. The non-transitory, computer-readable medium of claim 8, wherein the terminal device is a mobile communication device, and the identification of the terminal device includes at least one of a Medium Access Control (MAC) address, an International Mobile Equipment Identity (IMEI), a Thread Identifier (TID), or a mobile phone number.

11. The non-transitory, computer-readable medium of claim 8, wherein, determining the respective user identity location for each historical operation request initiated by the plurality of different users based on the respective user registration information for each of the plurality of different users comprises determining the respective user identity location based on a credential type and a credential number comprised in the respective user registration information.

12. The non-transitory, computer-readable medium of claim 11, wherein the credential type is a resident identification (ID) card, and the credential number is a resident ID number.

13. The non-transitory, computer-readable medium of claim 12, wherein the user identity location is determined by initial digits of the resident ID number.

14. The non-transitory, computer-readable medium of claim 8, wherein the operations further comprise determining account theft if the overall account theft risk level exceeds a threshold.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving an operation request from a terminal device;
      determining an identification of the terminal device;
      based on the identification of the terminal device, determining historical operation requests associated with a plurality of respective user accounts belonging respectively to a plurality of different users who initiated the historical operation requests from the terminal device in a predetermined time period prior to the operation request;
      determining a respective user identity location for each historical operation request initiated by the plurality of different users based on respective user registration information for each of the plurality of different users, wherein a granularity of the user identity location is a city or a county;
      computing, from the user registration information for the plurality of different users, a number of different cities or counties among the user identity locations for the plurality of different users associated with the historical operation requests;
      computing a risk level for the terminal device based on the number of different cities or counties computed from the user registration information for the plurality of different users indicating the user identity locations for the plurality of different users associated with the historical operation requests initiated from the terminal device;
      computing an account theft risk level for a user of the operation request; and
      computing an overall account theft risk level by combining the risk level for the terminal device and the account theft risk level for the user of the operation request.

16. The computer-implemented system of claim 15, wherein the terminal device is a personal computer (PC), and the identification of the terminal device includes at least one of a Medium Access Control (MAC) address, an Internet Protocol (IP) address, or a Unique Material Identifier (UMID).

17. The computer-implemented system of claim 15, wherein the terminal device is a mobile communication device, and the identification of the terminal device includes at least one of a Medium Access Control (MAC) address, an International Mobile Equipment Identity (IMEI), a Thread Identifier (TID), or a mobile phone number.

18. The computer-implemented system of claim 15, wherein, determining the respective user identity location for each historical operation request initiated by the plurality of different users based on the respective user registration information for each of the plurality of different users comprises determining the respective user identity location based on a credential type and a credential number comprised in the respective user registration information.

19. The computer-implemented system of claim 18, wherein the credential type is a resident identification (ID) card, and the credential number is a resident ID number.

20. The computer-implemented system of claim 19, wherein the user identity location is determined by initial 5 digits of the resident ID number.

* * * * *